United States Patent
Pai et al.

(10) Patent No.: US 8,321,560 B1
(45) Date of Patent: Nov. 27, 2012

(54) SYSTEMS AND METHODS FOR PREVENTING DATA LOSS FROM FILES SENT FROM ENDPOINTS

(75) Inventors: Manish Pai, Pune (IN); Milind Torney, Pune (IN)

(73) Assignee: Symantec Corporation, Mountain View, CA (US)

( * ) Notice: Subject to any disclaimer, the term of this patent is extended or adjusted under 35 U.S.C. 154(b) by 764 days.

(21) Appl. No.: 12/540,567

(22) Filed: Aug. 13, 2009

(51) Int. Cl.
*G06F 13/00* (2006.01)
(52) U.S. Cl. ........... 709/224; 709/225; 709/250; 726/22
(58) Field of Classification Search .................. 709/223, 709/224, 225, 250; 726/22
See application file for complete search history.

(56) References Cited

U.S. PATENT DOCUMENTS

| | | | |
|---|---|---|---|
| 6,671,820 B1 * | 12/2003 | Kelman | 714/6.3 |
| 7,991,747 B1 * | 8/2011 | Upadhyay et al. | 707/674 |
| 2009/0232300 A1 * | 9/2009 | Zucker et al. | 380/2 |
| 2010/0115614 A1 * | 5/2010 | Barile et al. | 726/22 |

\* cited by examiner

*Primary Examiner* — Viet Vu
(74) *Attorney, Agent, or Firm* — Advantedge Law Group LLC

(57) ABSTRACT

A computer-implemented method for data loss prevention may include intercepting a packet sent by an application of an endpoint. The computer-implemented method may also include extracting file-identification information from the packet. The computer-implemented method may further include identifying a list of opened files and matching the file-identification information to a file in the list of opened files. The computer-implemented method may additionally include identifying a data-loss-prevention policy that applies to the file. The computer-implemented method may moreover include filtering the packet based on the data-loss-prevention policy. Various other methods, systems, and computer-readable media are also disclosed.

20 Claims, 6 Drawing Sheets

SYSTEMS AND METHODS FOR PREVENTING DATA LOSS FROM FILES SENT FROM ENDPOINTS

BACKGROUND

In the electronic information age, people may share, access, and disseminate high volumes of information. The ease of disseminating information electronically is empowering. At the same time, the workforce has become increasingly mobile, and the ubiquity of high-speed Internet access, smart mobile devices, and portable storage means that "the office" may be anywhere. As a consequence, it has become more difficult than ever for organizations to prevent the loss of sensitive data. Organizations are therefore increasingly looking to Data Loss Prevention ("DLP") solutions to protect their sensitive data.

A typical endpoint DLP system may monitor, analyze, and filter content transferred through a variety of network protocols (such as FTP, HTTP, SMTP, and various instant messaging protocols). Many of these protocols may transfer a file in multiple packets. Unfortunately, traditional DLP systems may need to access the entire file to properly analyze the file (e.g., certain file formats may not be readable without the entire file intact). Thus, traditional DLP systems may have to stop all packets containing portions of a file before determining whether to block the file. For large files, such a process may greatly delay the file transfer and may waste computing resources. Some traditional DLP systems may rely on contextual analysis (e.g., the file sender, the destination of the file, the file format, etc.) instead of fully analyzing the content of the file, which may result in less accurate filtering decisions.

SUMMARY

The instant disclosure generally relates to systems and methods for data loss prevention. Embodiments of the instant disclosure may provide more efficient and effective data loss prevention by using file-identification information to identify and filter files. For example, a method for preventing data loss may include intercepting a packet sent by an application of an endpoint, extracting file-identification information from the packet, identifying a list of opened files, matching the file-identification information to a file in the list of opened files, identifying a data-loss-prevention policy that applies to the file, and filtering the packet based on the data-loss-prevention policy.

In some embodiments, identifying the data-loss-prevention policy that applies to the file may include analyzing content of the file to determine that the data-loss-prevention policy applies to the file. According to certain embodiments, filtering the packet may include at least one of blocking the packet and/or sending an alert about a violation of the data-loss-prevention policy. In various embodiments, identifying the list of opened files may include identifying a list of files opened by the application since the application began execution. Additionally or alternatively, identifying the list of opened files may include identifying a list of files currently open for the application and/or identifying a list of files opened within a predetermined timeframe.

In some embodiments, the method may include identifying a call by the application to open the file and adding the file, along with information identifying the application, to the list of opened files. The method may further include identifying a termination of the application and removing files associated with the application from the list of opened files.

In certain embodiments, extracting file-identification information from the packet includes identifying a protocol used to transfer the packet and parsing the packet for the file-identification information based on the protocol. According to various embodiments, matching the file-identification information to the file in the list of opened files may include identifying a partial filename within the file-identification information and resolving the partial filename to a file path of the file. Resolving the partial filename to a file path of the file may include retrieving a mapping of partial filenames to files for the application and determining that the partial filename maps to the file in the mapping.

In various embodiments, a system for data loss prevention may include an interception module, a matching module, and a filtering module. The interception module may be programmed to intercept a packet sent by an application and extract a partial filename from the packet. The matching module may be programmed to identify a list of opened files and match the partial filename to a file in the list of opened files. The filtering module may be programmed to identify a data-loss-prevention policy that applies to the file and filter the packet based on the data-loss-prevention policy.

In some embodiments, the filtering module may be programmed to identify the data-loss-prevention policy that applies to the file by analyzing content of the file to determine that the data-loss-prevention policy applies to the file. Additionally or alternatively, the filtering module may be programmed to filter the packet by blocking the packet and/or sending an alert about a violation of the data-loss-prevention policy.

In certain embodiments, the matching module may be programmed to identify the list of opened files by identifying a list of files opened by the process since the application began execution. Additionally or alternatively, the matching module may be programmed to identify the list of opened files by identifying a list of files currently open for the application and/or programmed to identify the list of opened files by identifying a list of files opened within a predetermined timeframe. In some embodiments, the matching module may be programmed to identify a call by the application to open the file and add the file, along with information identifying the application, to the list of opened files. The matching module may also be programmed to identify a termination of the application and remove files associated with the application from the list of opened files.

In various embodiments, a computer-readable-storage medium may include one or more computer-executable instructions that, when executed by at least one processor of a computing device, cause the computing device to intercept a packet sent by an application, extract a partial filename from the packet, identify a list of opened files, match the partial filename to a file in the list of opened files, identify a data-loss-prevention policy that applies to the file, and/or filter the packet based on the data-loss-prevention policy.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
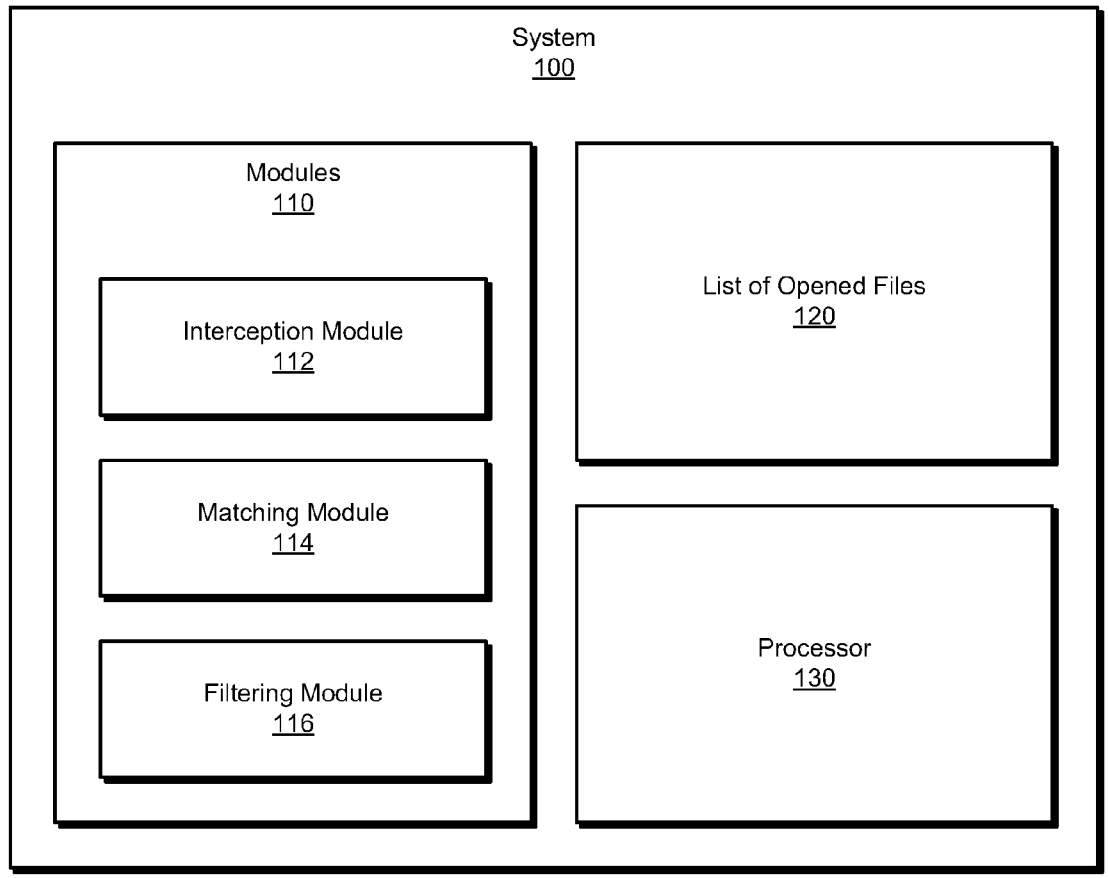
FIG. 1 is a block diagram of an exemplary system for data loss prevention.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for data loss prevention. Embodiments of the instant disclosure may improve data loss prevention by using file-identification information to identify and filter files. For example, after a DLP system has intercepted a packet sent by an application, the DLP system may extract file-identification information from the packet. The DLP system may then match the file-identification information to a file in a list of opened files (e.g., files that have been opened by the application). The DLP system may then determine which data-loss-prevention policy to apply to the packet based on the matching file rather than choosing a policy based only on contextual information surrounding the packet.

In various embodiments, the DLP system may analyze the content of the matching file to determine which data-loss policy to apply to the packet. In some embodiments, the list of opened files may include a list of files opened by the application that sent the packet since the application began execution. Additionally or alternatively, the list of opened files may include a list of files currently opened and/or a list of files opened within a predetermined timeframe. In certain embodiments, the DLP system may maintain the list of opened files. For example, the DLP system may identify calls by the application to open files and add those files, along with information to identify the application, to the list of opened files. When the application terminates, the DLP system may remove files associated with the application from the list of opened files.

Figure 2:
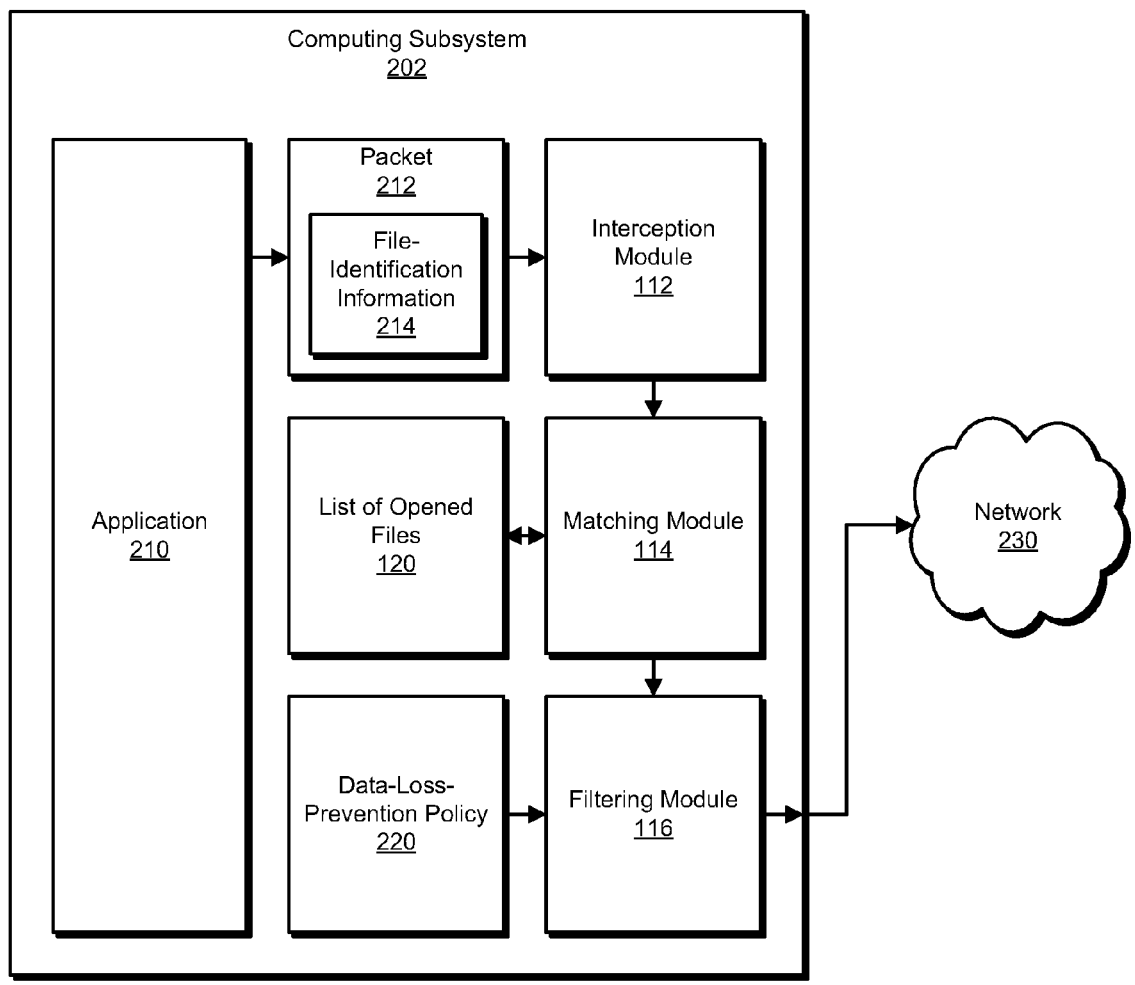
FIG. 2 is a block diagram of an exemplary system for data loss prevention.
Figure 3:
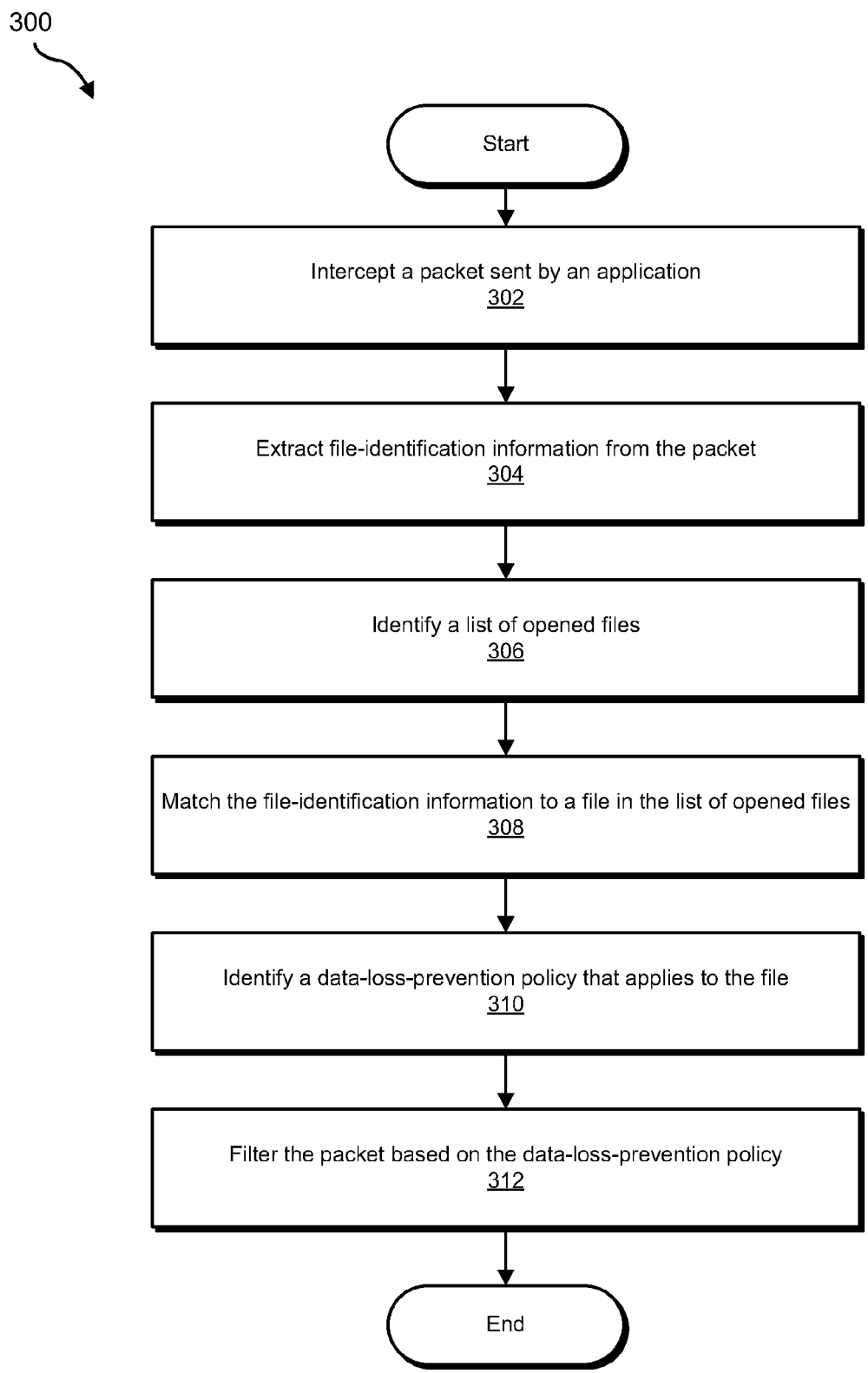
FIG. 3 is a flow diagram of an exemplary method for data loss prevention.
Figure 4:
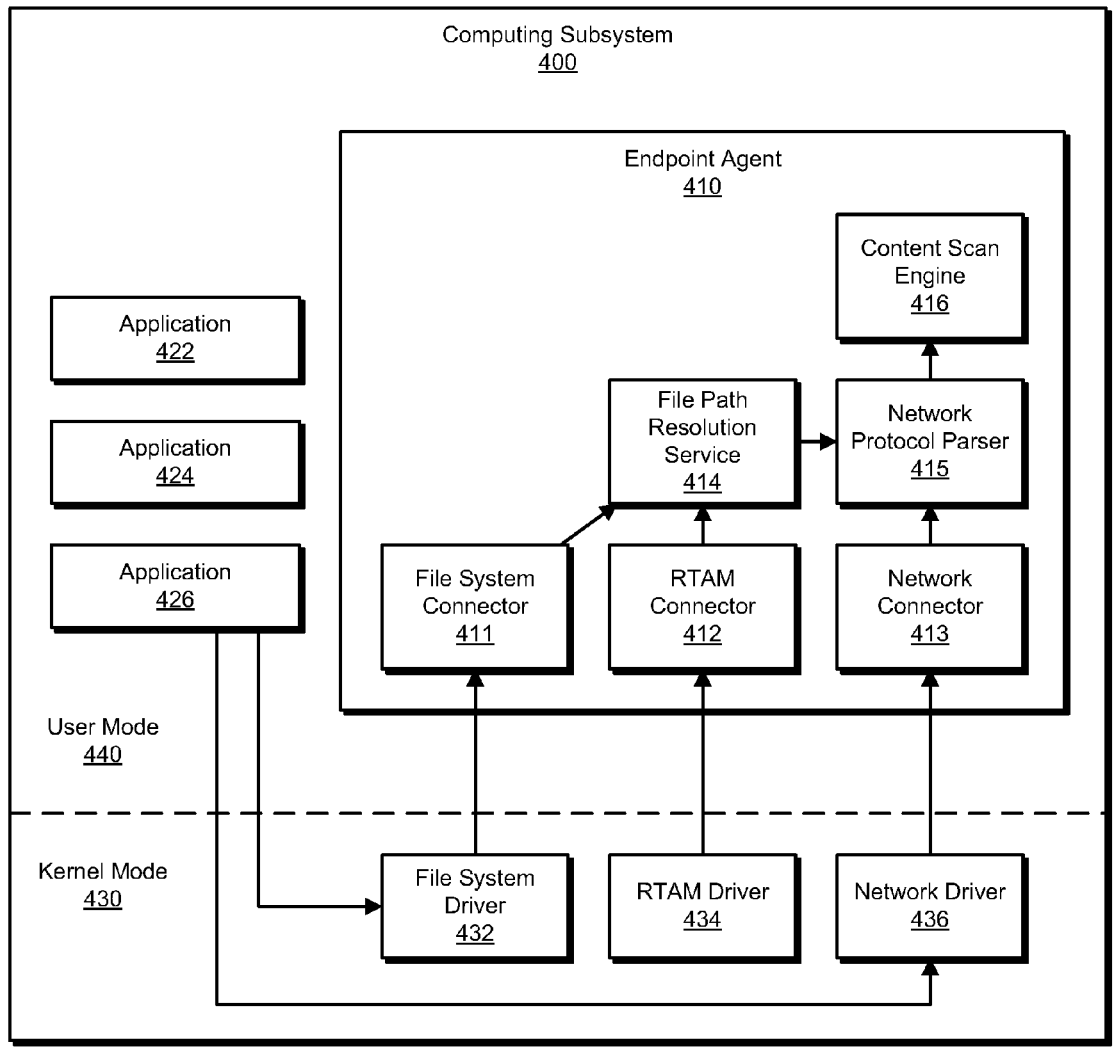
FIG. 4 is a block diagram of an exemplary method for data loss prevention.
Figure 5:
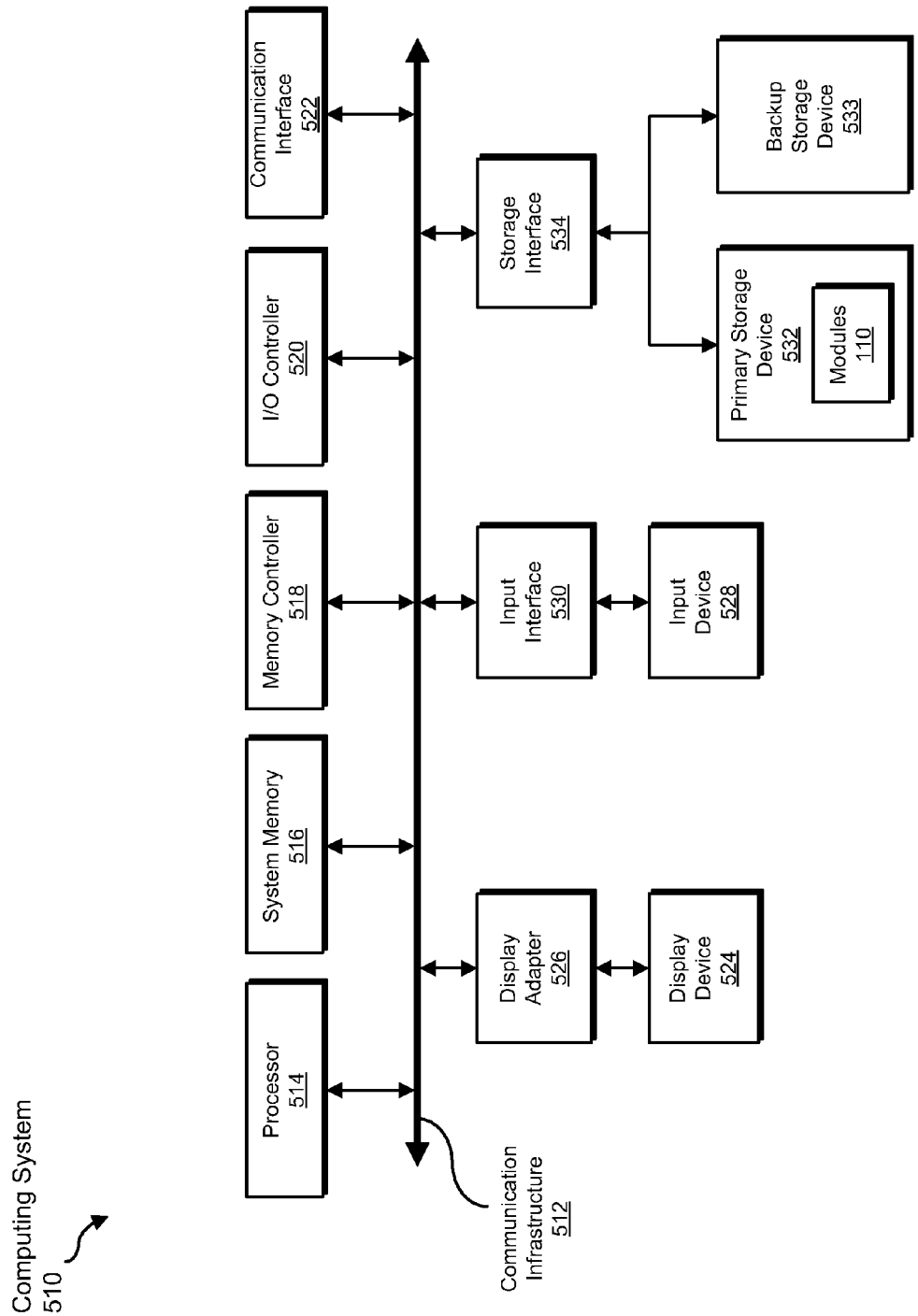
FIG. 5 is a block diagram of an exemplary computing system capable of implementing one or more of the embodiments described and/or illustrated herein.
Figure 6:
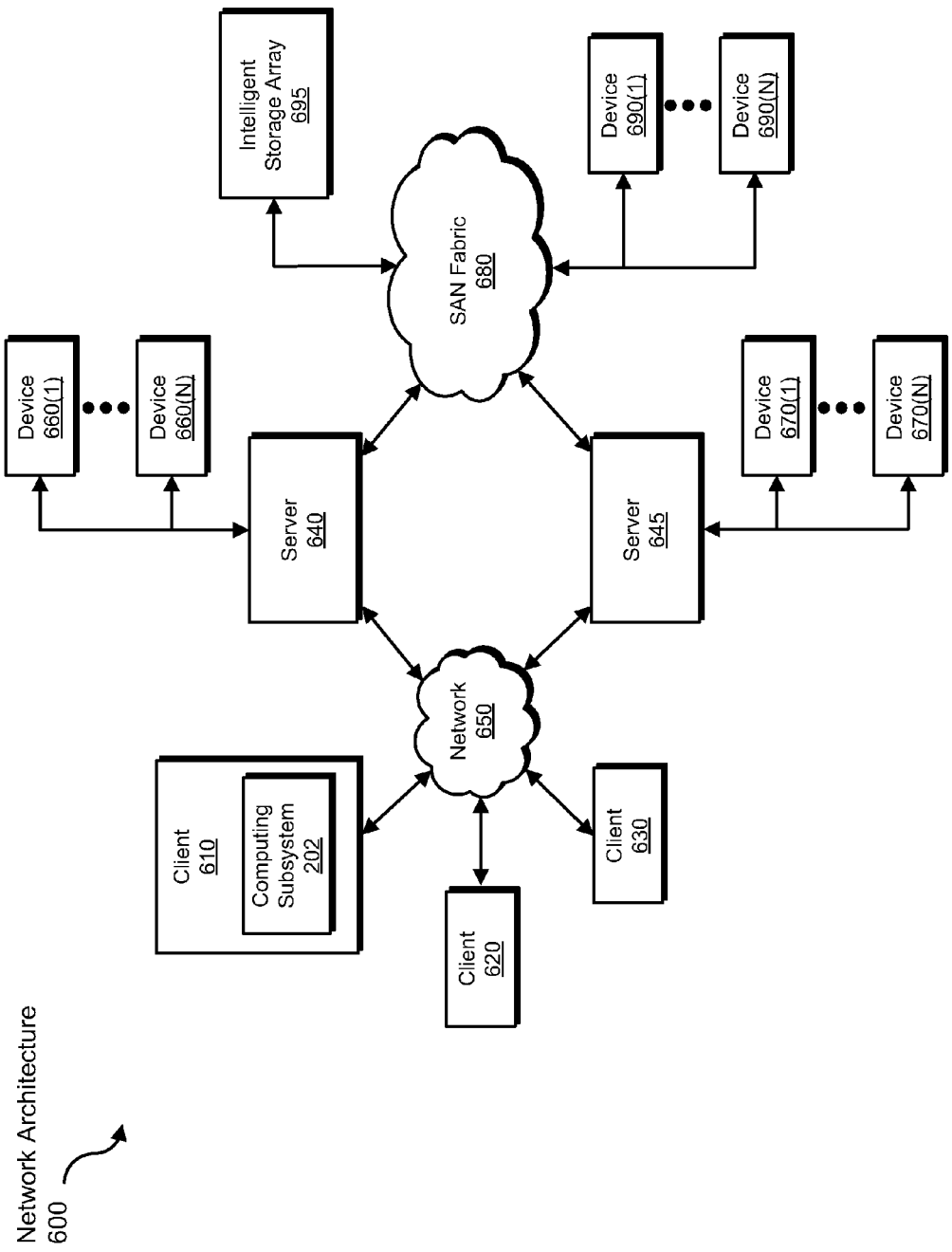
FIG. 6 is a block diagram of an exemplary computing network capable of implementing one or more of the embodiments described and/or illustrated herein.

FIGS. 1-2 show exemplary systems for data loss prevention, and FIG. 3 shows a method for accomplishing the same. FIG. 4 shows an exemplary system for data loss prevention using methods and/or systems disclosed herein. FIGS. 5 and 6 illustrate an exemplary computing system and network architecture for implementing embodiments of the instant disclosure.

FIG. 1 illustrates an exemplary system 100 for data loss prevention. As illustrated in this figure, system 100 may include one or more modules 110 for performing one or more tasks. For example, and as will be described in greater detail below, modules 110 may include an interception module 112, a matching module 114, and a filtering module 116.

Interception module 112 may be programmed to intercept a packet sent by an application and extract file-identification information from the packet. Matching module 114 may be programmed to identify a list of opened files (e.g., a list of opened files 120) and match the file-identification information to a file in the list of opened files. Filtering module 116 may be programmed to identify a data-loss-prevention policy that applies to the file and filter the packet based on the data-loss-prevention policy. Although illustrated as separate elements, one or more of modules 110 in FIG. 1 may represent portions of a single module or application.

In certain embodiments, one or more of modules 110 in FIG. 1 may represent one or more software applications or programs that, when executed by a computing device, may cause the computing device to perform one or more tasks. For example, as will be described in greater detail below, one or more of modules 110 may represent software modules stored and configured to run on one or more computing devices, such as computing subsystem 202 illustrated in FIG. 2, computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include a processor 130. Processor 130 may execute instructions forming part of one or more of modules 110.

FIG. 2 shows an exemplary system 200 for data loss prevention. As illustrated in this figure, exemplary system 200 may include a computing subsystem 202 in communication with a network 230. Computing subsystem 202 may include an application 210 which may send a packet 212 containing file-identification information 214. Interception module 112 may intercept packet 212 (otherwise destined for network 230) and extract file-identification information 214 from packet 212. Matching module 114 may identify a list of opened files 120 and match file-identification information 214 to a file in list of opened files 120. Filtering module 116 may then identify a data-loss-prevention policy 220 that applies to the file, and filter packet 212 based on data-loss-prevention policy 220. In some embodiments, filtering module 116 may filter packet 212 by blocking packet 212 from traversing network 230.

Computing subsystem 202 generally represents any type or form of computing device capable of reading computer-executable instructions. Examples of computing subsystem 202 include, without limitation, endpoint devices such as laptops, desktops, servers, cellular phones, personal digital assistants (PDAs), multimedia players, embedded systems, combinations of one or more of the same, and/or exemplary computing system 510 in FIG. 5.

Network 230 generally represents any medium or architecture capable of facilitating communication or data transfer. Examples of network 230 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 230 may facilitate communication or data transfer using wireless or wired connections. In one embodiment, network 230 may facilitate communication between computing subsystem 202 and other computing systems.

FIG. 3 is a flow diagram of an exemplary computer-implemented method 300 for data loss prevention. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2. For example, at step 302 interception module 112 may, as part of computing subsystem 202, intercept a packet sent by an application of an endpoint.

Interception module 112 may intercept the packet in any suitable manner. For example, interception module 112 may completely or partly reside within a network driver or user mode component that manages network traffic leaving computing subsystem 202. Additionally or alternatively, if computing subsystem 202 operates within a virtual machine, interception module 112 may intercept the packet by interfacing with or inspecting a virtual network device of the virtual machine.

As used herein, the term "packet" may refer to any unit and/or bundle of data designed and/or intended to travel across a network, such as an IP packet, a datagram, a frame, and/or any other collection of data transmitted as represented on any OSI layer. As used herein, the term "endpoint" generally refers to any computing system capable of initiating transfer of a file. As used herein, the term "application" may refer to any application, group of applications, process, and/or group of processes, that may open, read from, transfer, or otherwise access a file.

After intercepting the packet, at step 304 interception module 112 may extract file-identification information from the packet. As used herein, the phrase "file-identification information" may refer to any data within the packet or contextual data surrounding the packet that may identify or aid in identifying a file whose content may be transmitted, at least in part, by the packet. For example, file-identification information may include a name of a file, file metadata (such as size, creation time, or tags associated with the file), a format of the file, a fingerprint of the file (e.g., a checksum, a hash, and/or a digital signature of the file), a portion of file content being transferred, and/or any other information that may aid in locating, identifying, and/or isolating the file.

As will be described in greater detail below, the file-identification information may include a partial filename (e.g., a filename without a full path in directory-structured file systems). For example, the file-identification information may include the string "report.doc," which may refer to a file located at "C:\secret\report.doc:"

Interception module 112 may extract the file-identification information from the packet in a variety of ways. For example, interception module 112 may extract the file-identification information by identifying a protocol (e.g., HTTP, HTTPS, MIME, FTP, STMP, SIP, an Instant Messaging protocol, etc.) used to transfer the packet and then parsing the packet for the file-identification information based on the protocol. Additionally or alternatively, interception module 112 may simply parse the packet for the file-identification information based on an expected or predetermined format of the file-identification information.

Returning to FIG. 3, at step 306 matching module 114 may identify a list of opened files. As used herein, the term "list" in "list of opened files" may refer to any list, database, repository, and/or other information identifying one or more files, and may be gathered and/or organized in any suitable data structure and/or format. The phrase "opened file" may refer to any file that an application or process has accessed and/or read from. "Opened file" may also refer to any file (or other unit of stored data) whose contents an application or process has accessed and/or read from. Thus, a list of opened files may include files that are currently opened and/or files that are closed but were opened or accessed at some point in the past.

Matching module 114 may identify the list of opened files in a variety of contexts since the list of opened files may follow a number of different criteria. For example, in some embodiments matching module 114 may identify a list of files opened by an application since the application began execution. The list of files opened by the application since the application began execution may stand alone (e.g., list only files opened by a particular application) or may be part of a larger list or data structure of opened files (e.g., a list of multiple applications and files opened by those applications).

In some embodiments matching module 114 may identify a list of files currently open by an application (e.g., the application accessed the file) or for the application (e.g., the application has access to the contents of the file). For example, matching module 114 may query an operating system running the application to determine which files are currently open and which application or applications opened the files and/or have access to the files.

Additionally or alternatively, matching module 114 may identify a list of files opened within a predetermined timeframe. For example, matching module 114 may identify a list of files opened within the last ten minutes. In some embodiments, matching module 114 may identify a list of files opened within a predetermined timeframe.

In some embodiments, matching module 114 may also maintain and/or contribute to the list of opened files. For example, matching module 114 may identify a call by an application to open a file and then add the file, along with information identifying the application, to the list of opened files. Matching module 114 may identify the call by the application to open the file in any suitable manner. For example, matching module 114 may completely or partly reside within a file system driver that manages all attempts by applications to open files. In addition to adding files to the list of opened files, matching module 114 may identify when the application terminates so as to remove files associated with the application from the list of opened files.

Returning to FIG. 3, at step 308 matching module 114 may match the file-identification information to a file in the list of opened files. Matching module 114 may perform this step in any suitable manner. For example, matching module 114 may match the file-identification information to a file in the list of opened files by identifying a partial filename within the file-identification information and resolving the partial filename to a file path of the file. For example, if the partial filename were report.doc, matching module 114 may resolve the partial filename to C:\ secret\report.doc. In another example, an FTP protocol may provide a partial file name in a STOR, UNIQ, and/or APPEND command. Similarly, an HTTP protocol file upload request may specify a partial (or full) file name in a content-disposition tag of a MIME packet.

Matching module 114 may resolve the partial filename to a file path of the file in a variety of ways. For example, matching module 114 may search the list of opened files for a substring matching the partial filename and find the partial filename within the file path of the file. Additionally or alternatively, matching module 114 may retrieve, for the application, a mapping of partial filenames to files, and then determine that, in the mapping, the partial filename maps to the file. For example, when maintaining the list of opened files, matching module 114 may have created a mapping for a partial filename used by the application and the file path of the file.

Matching module 114 may thus enter and/or search for the partial filename in the mapping to produce the file path of the file. As used herein, the phrase "partial filename" may refer to any portion of a file name and/or path for identifying a file.

Returning to FIG. 3, at step 310 filtering module 116 may identify a data-loss-prevention policy that applies to the file. As used here, the phrase "data-loss-prevention policy" may refer to a policy and/or rule that describes, defines, or otherwise identifies content that an organization desires to protect. A data-loss-prevention policy may be configured in a variety of formats. For example, a data-loss-prevention policy may include signatures, such as hashes, of sensitive data. Additionally or alternatively, a data-loss-prevention policy may include the sensitive data itself. In some embodiments, a data-loss-prevention policy may include one or more entries in a database or list. For example, each row of customer data in a customer data list may comprise a data-loss-prevention policy. As another example, each product-pricing entry in a product database may comprise a data-loss-prevention policy. Alternatively, a single data-loss-prevention rule may include a set of database entries or other data entries.

A data-loss-prevention policy may apply to the content of one or more files. As used herein, the phrase "file" may refer to any form or type of data entity or digital information. For example, files may include data files, executable files, file segments or other portions of files, database entries, one or more segments of executable code, financial information, customer information, pricing information, product design information, trade-secret information, confidential information, privileged information and/or any other file or information.

In addition to identifying content of a file, a data-loss-prevention policy may also identify other attributes of the file. For example, a data-loss-prevention policy may identify a file name, a file creation date, a file modification date, a location where the file is stored, a size of the file, and/or any other attribute of the file. A data-loss-prevention policy may additionally or alternatively identify other contextual information associated with a file. For example, a data-loss-prevention policy may identify to whom a file is being sent, from whom a file is being sent, a destination location of a file, and/or any other contextual information associated with a file.

Filtering module 116 may identify a data loss prevention policy in any suitable manner. For example, filtering module 116 may determine that the file is on a blacklist of files that must not be transmitted across the network. Additionally or alternatively, filtering module 116 may analyze the content of the file to determine that the data-loss-prevention policy applies to the file. Filtering module 116 may analyze the content of the file in a variety of ways to determine that the data-loss-prevention policy applies to the file. For example, filtering module 116 may analyze the content of the file by searching for certain regular expressions (e.g., social security numbers) or matches of certain data strings (e.g., "CONFIDENTIAL"), hashing the file to determine whether it matches a file under a data-loss-prevention policy, conducting statistical analysis, and/or any other method which may implicate a data-loss-prevention policy.

At step 312, filtering module 116 may filter the packet based on the data-loss-prevention policy. Filtering module 116 may filter the packet in a variety of ways. For example, filtering module 116 may block the packet (e.g., fail to transmit it after intercepting it). Filtering module 116 may also return an error to the application indicating that the packet was not sent. In some embodiments, filtering module 116 may send an alert about a violation of the data-loss-prevention policy (e.g., to a system administrator).

For the sake of clarity, and by way of example only, FIG. 4 illustrates an exemplary system 400 for data loss prevention. Components of system 400 may operate within a kernel mode 430 or a user mode 440. An endpoint agent 410 may operate within user mode 440, along with applications 422, 424, and 426. A file system driver 432, a RTAM (real-time application monitoring) driver 434, and a network driver 436 may operate within kernel mode 430.

When an application launches, such as application 426, RTAM driver 434 may detect the launch and send the information to a RTAM connector 412 operating as part of endpoint agent 410 in user mode 440. Likewise, when an application terminates, such as application 426, RTAM driver 434 may detect the termination and send the information to RTAM connector 412. RTAM connector 412 may remove files associated with application 426 from a list of opened files when application 426 terminates.

When application 426 opens a file, file system driver 432 may send information regarding the application (e.g., an application or process identifier) and the file path to a file system connector 411 operating as part of endpoint agent 410 in user mode 440. File system connector 411 may add the information associating the application and the file path to a list of opened files.

When application 426 attempts to transmit, across a network, a packet containing a portion of the file that it previously opened or that it accessed in preparation for sending across the network, network driver 436 may detect and intercept the attempt. Network driver 436 may then forward the packet to a network connector 413 for inspection.

A network protocol parser 415 may then parse the packet for file-identification information, such as a partial filename. Once network protocol parser 415 finds the file-identification information, network protocol parser 415 may query a file path resolution service for the full path of the file. File path resolution service 414 may use the list of opened files as created by file system connector 411 and/or RTAM connector 412 to map the partial filename to a full file path. Once network protocol parser 415 receives the full file path from file path resolution service 414, network protocol parser 415 may forward the full file path to content scan engine 416, which may access the file at the full file path to scan and analyze the content of the file in entirety. Content scan engine 416 may then determine that a data-loss-prevention policy applies to the file and treat the packet accordingly (e.g., block the packet if the packet violates a data-loss-prevention policy).

One or more of modules 110 may comprise portions of components of computing system 400. For example, interception module 112 may include portions of network driver 436, network connector 413, and/or network protocol parser 415. Matching module 114 may include portions of file system driver 432, RTAM driver 434, file system connector 411, RTAM connector 412, and/or file path resolution service 414. Filtering module 116 may include portions of content scan engine 416.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the intercepting, extracting, identifying, matching, filtering, analyzing, blocking, sending, adding, removing, parsing, retrieving, and/or determining steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below).

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as intercepting, extracting, identifying, matching, filtering, analyzing, blocking, sending, adding, removing, parsing, retrieving, and/or determining.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the intercepting, extracting, identifying, matching, filtering, analyzing, blocking, sending, adding, removing, parsing, retrieving, and/or determining steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 594 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the intercepting, extracting, identifying, matching, filtering, analyzing, blocking, sending, adding, removing, parsing, retrieving, and/or determining steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the intercepting, extracting, identifying, matching, filtering, analyzing, blocking, sending, adding, removing, parsing, retrieving, and/or determining steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, one or more of modules 110 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the intercepting, extracting, identifying, matching, filtering, analyzing, blocking, sending, adding, removing, parsing, retrieving, and/or determining steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the intercepting, extracting, identifying, matching, filtering, analyzing, blocking, sending, adding, removing, parsing, retrieving, and/or determining steps disclosed herein. Network architecture 600 may also be used to perform and/or be a means for performing other steps and features set forth in the instant disclosure.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed. One or more of the steps disclosed herein may transform data and/or a configuration of a storage device by modifying data on the storage device. In some embodiments, one or more steps of the instant disclosure may transform a computing system into a data-loss-prevention filtering device.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In certain embodiments, one or more of the software modules disclosed herein may be implemented in a cloud computing environment. Cloud computing environments may provide various services and applications via the internet. These cloud-based services (e.g., software as a service, platform as a service, infrastructure as a service, etc.) may be accessible through a web browser or other remote interface. Various functions described herein may be provided through a remote desktop environment or any other cloud-based computing environment. For example, packets may be intercepted in a cloud computing environment and/or one or more of modules 110 may operate in a cloud computing environment.

In addition, one or more of the modules described herein may transform data, physical devices, and/or representations of physical devices from one form to another. For example, filtering module 116 may transform a data stream by filtering a packet based on a data-loss-prevention policy.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for data loss prevention, at least a portion of the method being performed by a computing device comprising at least one processor, the method comprising:
   intercepting a packet sent by an application of an endpoint;
   extracting file-identification information from the packet;
   identifying a list of opened files;
   matching the file-identification information to a file in the list of opened files;
   identifying a data-loss-prevention policy that applies to the file;
   filtering the packet based on the data-loss-prevention policy.

2. The computer-implemented method of claim 1, wherein identifying the data-loss-prevention policy that applies to the file comprises analyzing content of the file to determine that the data-loss-prevention policy applies to the file.

3. The computer-implemented method of claim 1, wherein filtering the packet comprises at least one of:
   blocking the packet;
   sending an alert about a violation of the data-loss-prevention policy.

4. The computer-implemented method of claim 1, wherein identifying the list of opened files comprises identifying a list of files opened by the application since the application began execution.

5. The computer-implemented method of claim 1, wherein identifying the list of opened files comprises identifying a list of files currently open for the application.

6. The computer-implemented method of claim 1, wherein identifying the list of opened files comprises identifying a list of files opened within a predetermined timeframe.

7. The computer-implemented method of claim 1, further comprising:
   identifying a call by the application to open the file;
   adding the file, along with information identifying the application, to the list of opened files.

8. The computer-implemented method of claim 7, further comprising:
   identifying a termination of the application;

removing files associated with the application from the list of opened files.

9. The computer-implemented method of claim 1, wherein extracting the file-identification information from the packet comprises:
   identifying a protocol used to transfer the packet;
   parsing the packet for the file-identification information based on the protocol.

10. The computer-implemented method of claim 1, wherein matching the file-identification information to the file in the list of opened files comprises:
    identifying a partial filename within the file-identification information;
    resolving the partial filename to a file path of the file.

11. The computer-implemented method of claim 10, wherein resolving the partial filename to a file path of the file comprises:
    retrieving a mapping of partial filenames to files for the application;
    determining that the partial filename maps to the file in the mapping.

12. A system for data loss prevention, the system comprising:
    an interception module programmed to:
      intercept a packet sent by an application of an endpoint;
      extract a partial filename from the packet;
    a matching module programmed to:
      identify a list of opened files;
      match the partial filename to a file in the list of opened files;
    a filtering module programmed to:
      identify a data-loss-prevention policy that applies to the file;
      filter the packet based on the data-loss-prevention policy;
    one or more processors configured to execute the interception module, the matching module, and the filtering module.

13. The system of claim 12, wherein the filtering module is programmed to identify the data-loss-prevention policy that applies to the file by analyzing content of the file to determine that the data-loss-prevention policy applies to the file.

14. The system of claim 12, wherein the filtering module is programmed to filter the packet by at least one of:
    blocking the packet;
    sending an alert about a violation of the data-loss-prevention policy.

15. The system of claim 12, wherein the matching module is programmed to identify the list of opened files by identifying a list of files opened by the process since the application began execution.

16. The system of claim 12, wherein the matching module is programmed to identify the list of opened files by identifying a list of files currently open for the application.

17. The system of claim 12, wherein the matching module is programmed to identify the list of opened files by identifying a list of files opened within a predetermined timeframe.

18. The system of claim 12, wherein the matching module is further programmed to:
    identify a call by the application to open the file;
    add the file, along with information identifying the application, to the list of opened files.

19. The system of claim 18, wherein the matching module is further programmed to:
    identify a termination of the application;
    remove files associated with the application from the list of opened files.

20. A computer-readable-storage medium comprising one or more computer-executable instructions that, when executed by at least one processor of a computing device, cause the computing device to:
    intercept a packet sent by an application of an endpoint;
    extract a partial filename from the packet;
    identify a list of opened files;
    match the partial filename to a file in the list of opened files;
    identify a data-loss-prevention policy that applies to the file;
    filter the packet based on the data-loss-prevention policy.

\* \* \* \* \*